Patented Oct. 5, 1954

2,691,040

UNITED STATES PATENT OFFICE 2,691,040

SULFONATION OF ORGANIC COMPOUNDS WITH SULFUR TRIOXIDE

Herman S. Bloch, Riverside, and Howard E. Mammen, North Riverside, Ill., assignors to Universal Oil Products Company, Chicago, Ill., a corporation of Delaware No Drawing. Application March 29, 1951, Serial No. 218,251

9 Claims. (Cl. 260—505)

This invention relates to a process for sulfonating organic compounds, and particularly alkylaryl hydrocarbons for the production of the corresponding sulfonic acid derivatives in a particularly advantageous manner whereby products having optimum physical properties are obtained. More specifically, the invention concerns a sulfonation process utilizing a sulfonating agent comprising sulfur trioxide diluted with an inert gas in which the concentration of sulfur trioxide in the sulfonating agent is maintained at specified values during the initial and final stages of the sulfonation reaction with the specific object of limiting the rate and the temperature of the reaction.

The use of sulfur trioxide-inert diluent gaseous mixtures for sulfonation of hydrocarbons is widely recognized as an effective sulfonating agent, as illustrated in R. L. Brandt Reissue Patent 22,548 and Patent No. 2,523,582 issued to R. W. Mattson as well as other patent and literature references comprising the prior art in this method of sulfonation. The adverse effect of high temperatures while maintaining the feed stock in bulk liquid phase condition during the period of contacting the reactants is also widely recognized, in particular with respect to the adverse effect of high temperatures on the color and odor of the final sulfonic acid or sulfonate product. The observed undesirable effects accompanying the inadequate dissipation of heat from the reaction mixture as the result of the highly exothermic sulfonation reaction are believed to be caused by the extreme activity of sulfur trioxide in contacting the initial, unreacted feed stock, the inadequate removal of exothermic reaction heat from the sulfonation reaction centers, aggravated by the increase in viscosity as the sulfonation proceeds and the enhanced oxidizing and condensing activity of the sulfur trioxide at the higher reaction temperatures resulting in the production of undesirably colored by-products ond odoriferous substances. Other reactions, such as polysulfonation, cracking reactions, and dealkylation (as in the case of utilizing an alkylaromatic hydrocarbon as the charging stock) are also believed to accompany the sulfonation at uncontrolled reaction temperatures, producing modified by-products having less desirable activity than expected from the sulfonates of the initial or unmodified charging stock. The sulfonation process comprising the present invention is primarily characterized by the specific method of controlling the charging rate of the sulfur trioxide-containing sulfonating agent into a liquid pool of the sulfonatable organic compound utilized as charging stock whereby the temperature of the reaction mixture is rigidly controlled within specified limits and the sulfonated product is formed in a substantially colorless condition having desirable detergent properties and in high yields from a given quantity of charging stock. The present process is distinguished from sulfonation methods of the prior art by the selective control of temperatures through the novel expedient of controlling the sulfur trioxide charging rate and the concentration of sulfur trioxide in the sulfonating agent which thereby limits the maximum temperature at the point of contact between the sulfur trioxide and the charging stock as well as the viscosity and consequently the distribution of sulfur trioxide in the mixture of reactants. One object, therefore, of the invention is to provide a process for sulfonating organic compounds to form products having less of the undesirably colored and odor producing by-products than products formed by processes in which the present improvements are not utilized to eliminate undesirable side reactions. Another object of the invention is to increase the yield of sulfonated products from a given quantity of organic compound charged to the sulfonation reaction.

In one of its embodiments, the present invention concerns an improvement in the process for sulfonating organic sulfonatable compounds in liquid phase at temperatures of from about 0° to about 70° C. with a sulfonating agent comprising a mixture of sulfur trioxide vapor and an inert carrier gas therefor, said improvement comprising the method of supplying the initial 0.5 mole of sulfur trioxide per mole of organic compound to the sulfonation reaction zone during a first sulfonation period at a concentration in said sulfonating agent of not greater than 5 mole per cent and thereafter during a second sulfonation period supplying from about 0.5 to about 0.8 mole of sulfur trioxide per mole of organic compound at a concentration in said sulfonating agent of from about 5 to about 80 mole per cent at a rate such that the maximum temperature attained during the second period does not substantially exceed the maximum temperature attained during said first period.

A more specific embodiment of the present invention concerns an improvement in the process for sulfonating a long chain alkyl substituted benzene hydrocarbon containing from about 9 to about 18 carbon atoms per long chain alkyl group in liquid phase and at a temperature of from about 20° to about 50° C. with a sulfonating agent comprising a mixture of sulfur trioxide vapor and an inert carrier gas therefor, said improvement comprising a method of supplying the initial 0.5 mole of sulfur trioxide per mole of alkylbenzene hydrocarbon to the sulfonation reaction zone during a first sulfonation period at a concentration in said sulfonating agent of from about 2 to about 4 mole per cent of sulfur trioxide and thereafter during a second sulfonation period supplying from about 0.5 to about 0.8 mole of sulfur trioxide per mole of alkylbenzene hydrocarbon at a concentration in said sulfonating agent of from about 10 to about 20 mole per cent of sulfur trioxide at a rate such that the maximum temperature attained during the second period does not substantially exceed the maximum attained during said first period.

Other objects and embodiments of the present invention relating to specific aspects of the present sulfonation process will be referred to in greater detail in the following further description of the invention.

The process herein provided for the sulfonation of organic sulfonatable compounds is in particular recognition of the tendency of organic compounds to acquire an undesirable discoloration upon sulfonation as a result of local high temperature areas from which the exothermic heat of sulfonation is dissipated and removed from the sulfonation zone at an inadequate rate. Although the present method may be applied with equal advantage to sulfonation reactions as well as sulfation reactions generally certain organic compounds utilizable as starting materials are particularly adapted to the present method of sulfonation, especially compounds of aromatic or alkylaromatic structure, the latter forming undesirable by-product condensation or oxidation products during the sulfonation which are highly colored tar-like materials or tacky, non-crystalline gum-like products and which form final products varying from light cream to dark brown in color of such character that the color impurities are not readily removed or which are bleached to more acceptable lighter colors only at great additional expense. Product discoloration by the presence of colored contaminants is particularly undesirable in products intended for human use where consumer appeal is a desired factor in the wide acceptance of the product by the consuming public. Such considerations are particularly controlling in the selection of a sulfonation process in the commercial manufacture of detergents where only a light-colored detergent product is thought to be consonant with good detergency because of the association of whiteness with cleanliness.

A group of detergents having sulfate or sulfonate radicals in the structure of the detergent molecule are widely accepted as effective detergents, especially for use in hard water. Typical of representative sulfated and sulfonated compounds having detergent properties include the long chain alcohol sulfates, such as the sodium salts of the acid sulfate esters of lauryl alcohol, the long chain alkylaryl sulfonates, containing alkyl groups having from about 9 to about 18 carbon atoms per group, the alkyl phenol sulfonates having similarly long chain alkyl groups, the long chain fatty acid ester sulfates and their alkali metal salts, such as the oleic acid glyceride or glycol sulfates and others. The present method of sulfonation utilizing sulfur trioxide vapor diluted with an inert carrier gas is an especially effective sulfonating method when utilizing a feed stock or charging material of relatively high molecular weight such as the starting materials in detergent production or of oil-soluble rust-preventive sulfonates where the viscosity of the sulfate or sulfonate intermediate product tends to limit the rate of heat dissipation from the reaction mixture, particularly as the reaction approaches completion. Sulfur trioxide vapor, particularly when diluted with an inert carrier gas as the sulfonating agent, attacks the sulfonatable organic compound at dispersed points of reactivity, thereby limiting the size of the centers of high temperature occurring at the point of contact between the sulfonating agent and the sulfonatable organic compound. The dispersal of the local high temperature zones of reaction permits rapid dissipation of the heat to adjacent areas in a continuous liquid phase and ultimately to the refrigerant in the system. Such advantages accompanying the use of sulfur trioxide vapor diluted with an inert carrier gas, however, are not realized when the proportion of sulfur trioxide in the gaseous sulfonating agent is too high to permit rapid dissipation of the exothermic heat of sulfonation from the local zones of contact between the sulfur trioxide and sulfonatable organic compound; in other words, the dissipation of heat is not sufficiently rapid particularly with high molecular weight, high viscosity, detergent producing charging stocks if the particles of sulfur trioxide vapor are not sufficiently dispersed in the mixture of sulfur trioxide and inert carrier gas. Such considerations are especially operative in the initial stages of the sulfonation when the sulfur trioxide is rapidly absorbed and reacted in the sulfonation reaction mixture and the sulfur trioxide is substantially completely absorbed at a point immediately adjacent to the inlet port of the sulfur trioxide-inert gaseous stream with the consequent rapid increase in temperature at this point. The present method of sulfonation provides a means of overcoming the above indicated defects in sulfur trioxide sulfonation processes by varying the proportion of sulfur trioxide in the gaseous sulfonating agent utilizing a system in which the concentration of sulfur trioxide in the sulfonating agent is lowest during the initial stages of the sulfonation when a higher reaction rate is realized in the system and the build-up of high temperatures is greatest at the local zone of contact immediately adjacent to the inlet port of the sulfur trioxide-inert gas stream and thereafter increasing the concentration of sulfur trioxide in the sulfonating agent when the reaction rate (and hence rate of heat evolution) has decreased by virtue of the dilution of the sulfonatable material by sulfate or sulfonic acid molecules of reaction product. At no time, therefore, during the resultant sulfonation are zones of excessively high temperature present in the sulfonation reaction system.

Suitable charging stocks or starting materials which may be sulfated or sulfonated by means of the present procedure are characterized herein as sulfonatable organic compounds, although the method is particularly advantageous when applied to the sulfonation of aromatic compounds, and especially alkyl aromatic hydrocarbons, as hereinafter specified, for the formation of the corresponding sulfonic acid derivatives utilizable as detergent intermediates. Organic compounds within the broad class of charging stocks include such compounds as the phenols and alkylphenols; alcohols of both the aliphatic and cycloaliphatic series; aromatic hydrocarbons such as the various benzene derivatives containing a nuclearly displaceable hydrogen atom and the polycyclic aromatic hydrocarbons containing naphthyl, phenanthryl, and anthryl nuclei; heterocyclic compounds such as thiophene, pyridine, and the like; ethers and esters such as phenylmethylether and the fatty acid glycerides respectively, the latter class including such compounds as the glyceride mono-esters of oleic acid, etc.; acids such as benzoic acid; and various derivatives of the above classes of compounds which may contain other substituents such as one or more radicals of the group halo, nitro, amino, keto, carboxyl, etc. The advantages of the present method of sulfonation are especially evident in the production of color-sensitive alkyl aromatic sulfonic acids, which when neutralized with a suitable basic reagent such as an alkali metal hydroxide, an amine or an alkanol amine form highly effective detergent compounds.

The present process is designated for convenience as a sulfonation reaction, although in the case of certain organic compounds containing a reactive hydroxyl group in the structure of the compound, the product contains a sulfate rather than a sulfonic acid substituent and the reaction is characteristically a sulfation reaction rather than a sulfonation reaction. In designating the present reaction herein as one of sulfonation, it is intended that the scope of the term be extended to generically designate sulfation reactions as well as strictly sulfonation reactions, the process in either case resulting in the substitution of the sulfo radical in the molecule of the initial starting material.

The material herein designated as the inert carrier gas in which the vaporized sulfur trioxide sulfonating agent is suspended is more specifically characterized as a substance which is a gas or vapor at the particular sulfonation conditions and which does not react to any substantial degree at the specified sulfonating conditions with either the sulfonating agent or the sulfonatable organic compound. Inert gaseous substances utilizable as the sulfur trioxide carrier gas include air, nitrogen, carbon dioxide, carbon monoxide, sulfur dioxide, or a low molecular weight paraffinic hydrocarbon, such as methane, ethane, propane, butane, or a mixture thereof. In order to suspend the desired quantity of sulfur trioxide in the carrier gas in accordance with the present operation, the carrier gas may be passed through a sulfur trioxide pick-up zone containing a bulk supply of liquid or solid sulfur trioxide at a temperature sufficient to vaporize a sufficient quantity of the sulfur trioxide to provide the desired concentration of reactive sulfonating component in the gaseous mixture specified for the various reaction stages of the present process. For this purpose, the carrier gas may be merely bubbled into a quantity of the sulfur trioxide or it may be charged into a tower containing an inert packing material over which the sulfur trioxide is allowed to flow in contact with the carrier gas, preferably introduced into the bottom of the tower. The concentration of sulfur trioxide in admixture with inert carrier gas to form a sulfonating agent having the desired proportion of sulfur trioxide therein for the initial and final stages of the present sulfonation process may be conveniently varied by increasing the proportion of inert carrier gas in the effluent stream from the sulfur trioxide pick-up zone, for example, by adding additional inert carrier gas to the stream effluent from the pick-up zone.

The active component of the present sulfonating agent mixed with the inert carrier gas is sulfur trioxide which may be utilized in any of its various physical modifications, including the so-called alpha form, a solid asbestos-like material melting at about 62° C. comprising a sulfur trioxide polymer, the beta form, a polymeric solid at normal temperatures melting at about 33° C., and the gamma form, a normally liquid modification of sulfur trioxide at room temperatures containing a large proportion of monomeric sulfur trioxide and melting at about 17° C. Any of the above specified modifications of sulfur trioxide may be utilized in the present pick-up zone, although the gamma form is generally preferred. A stabilized gamma form manufactured commercially under the trade-name "Sulfan" contains an inhibitor which maintains the sulfur trioxide in liquid condition at temperatures higher than its melting point. The inert carrier gas is passed through the bulk supply of sulfur trioxide maintained at any suitable temperature, preferably above the boiling point of the reagent, the concentration of the sulfur trioxide in the inert gas being adjusted to any desirable value by mixing additional inert gas carrier with the effluent mixture from the sulfur trioxide pick-up zone. At equilibrium conditions, the quantity of sulfur trioxide present in the carrier gas is constant at uniform temperature and contact conditions, between the carrier gas and the bulk supply of sulfur trioxide, and it is therefor possible to control both the relative proportion of sulfur trioxide and sulfonatable organic compounds as well as the relative proportion of sulfur trioxide in the inert carrier gas introduced into the sulfonation reactor by maintaining the flow of carrier gas continuous at a predetermined constant rate and temperature through the pick-up zone while maintaining the supply of the sulfonatable organic compound at a given constant value.

In accordance with the present method of effecting the sulfation and sulfonation of organic compounds, the mixture of inert carrier gas and sulfur trioxide vapor is led into a quantity of the sulfonatable organic compound maintained in liquid phase and under efficient stirring conditions in both the initial and final stages of the sulfonation process. The feature of the present invention which enables the production of high yields of sulfate or sulfonic acid product with a minimum production of undesirable colored impurities comprises maintaining the concentration of sulfur trioxide in the inert gas at less than 5 mole per cent of sulfur trioxide in the inert gas during the initial stages of the sulfonation, that is, until approximately 50 mole per cent (based on the sulfonatable compound) of the sulfur trioxide has been charged to the sulfonation zone and thereafter, during the final stages of the sulfonation, increasing the proportion of sulfur trioxide in the inert carrier gas above about 5 mole per cent, up to about 80 mole per cent, preferably from about 10 to about 20 mole per cent of sulfur trioxide, until completion of the sulfonation or until the reaction mixture attains substantial equilibrium at which point further addition of sulfur trioxide to the reaction mixture accomplishes essentially no further sulfonation. This procedure is based upon our observation that the peak temperatures during sulfonation are developed during addition of the first half mole of sulfur trioxide, and that thereafter the rate of heat evolution abruptly decreases, so that it is possible to speed up the feed of sulfur trioxide without developing excessive temperatures.

The sulfonation reaction mixture is preferably maintained at a temperature of from about 10° to about 70° C., and more preferably from about 30° to about 50° C. during the sulfonation, the preferred reaction temperature in general depending upon the rate of sulfonation which determines the amount of heat liberated during the exothermic sulfonation reaction. The gaseous sulfonating agent comprising sulfur trioxide suspended in an inert carrier gas is led into the sulfonation reaction mixture for a time period sufficient to provide a total molar ratio of sulfur trioxide to sulfonatable organic compound of at least 1:1 and preferably from about 1.2:1 to about 2:1 when the desired product of the process is a mono-sulfate or mono-sulfonate and at higher ratios, up to about 5 to 1 when a disulfo-substituted or polysulfo-substituted product is desired. In general, reaction periods of from about five minutes to about two hours may be provided, and if unreacted feed stock remains in the sulfonation reaction mixture following the addition of the above quantity of sulfur trioxide to the sulfonation reactor, the mixture may be extracted or otherwise treated to remove unconverted charging stock from the desired product, the unconverted portion of which may be recycled to the sulfonation reactor. The reaction mixture may then be diluted with water, neutralized with a suitable basic reagent, the sulfate or sulfonate of which is desired as the ultimate product of the process or diluted only in part to cause a dilute sulfuric acid phase to separate from the sulfonic acid or acid sulfate product, thereby terminating the sulfonation and other side reactions occurring in the system. The temperature during the latter operation is also preferably maintained at a low value to minimize the tendency of the reaction mixture to undergo discoloration at the higher temperatures resulting from the accompanying hydration of the sulfur trioxide in the system.

In the sulfation or sulfonation of most organic compounds with sulfur trioxide, and particularly in the sulfonation of alkyl aromatic hydrocarbons in which the development of colored impurities is desirably avoided in order to produce products having optimum physical and detergent properties, it is preferable to provide a sulfuric acid or oleum "heel" in the sulfonation reaction mixture, obtained by adding a concentrated sulfuric acid or oleum to the sulfonation reactor in an amount of about 5% up to about 20% by weight of the alkylate charging stock. The sulfuric acid "heel" for this purpose is desirably a relatively concentrated acid containing at least 90% sulfuric acid, and oleums containing up to about 60% by weight of free sulfur trioxide. The "heel" is preferably maintained in as fine a state of subdivision as possible throughout the sulfonation reaction mixture which may be realized by vigorously stirring the reaction mixture, for example, with stirring paddles, orifice mixers, or other convenient means well known in the art. The principle advantage in the use of a "heel" for the sulfonation reaction is the tendency of the sulfuric acid to minimize the development of colored impurities and to enhance the yield, presumably by providing a liquid transfer medium in the sulfonation reaction mixture whereby more intimate contact between the charging stock and sulfur trioxide may be obtained.

The sulfonatable organic compound utilized as charging stock in the present sulfonation reaction may be diluted with an inert liquid prior to its introduction into the sulfonation zone, and for such purpose a low boiling, inert, organic liquid which evaporates at the upper limit of the desired sulfonation temperature is particularly preferred, thus providing a further means for controlling the reaction temperature by dissipation of the exothermic heat through evaporative cooling. In the case of utilizing an alkyl aromatic charging stock, a suitable inert, organic liquid may comprise a low boiling paraffinic hydrocarbon such as liquid butane, pentane, hexane, etc. or a halogen-substituted paraffin compound, such as chloroform, carbon tetrachloride, perfluorobutane, perfluoropentane, etc. When the sulfated or sulfonated product is to be separated from the excess sulfur trioxide sulfonating agent or the sulfuric acid "heel" utilizable in the reaction, or when the entire reaction mixture or the sulfonated portion thereof is to be neutralized following the sulfonation reaction, the inert organic liquid diluent also preferably accompanies the reaction mixture into the separation or neutralization reactor, the evaporating solvent serving to dissipate the exothermic heat of reaction and disperse the liquid reactants.

The present invention is further illustrated with respect to specific embodiments thereof in the following illustrative examples which, however, are merely exemplary of the present preferred mode of operation and are not intended to define the limits of the present method of operation in strict accordance therewith.

*Example I*

Toluene alkylate in which the nuclear toluene alkyl group contains an average of about 12 carbon atoms per alkyl group prepared by the sulfuric acid catalyzed alkylation of toluene with a propylene tetramer fraction boiling from about 170° to about 225° C. was utilized in the following experiment, the toluene alkylate having a boiling range of from about 270° to about 325° C. The alkylate was supplied at a constant rate of flow from a liquid reservoir of the alkylate cooled to the desired temperature and allowed to flow through a contacting chamber in which the alkylate was mixed and stirred with a sulfur trioxide-air mixture supplied at a constant rate and containing the desired proportion of sulfur trioxide therein. The air-sulfur trioxide mixture was made up by bubbling dried air at a predetermined constant rate through a bulk supply of liquid sulfur trioxide maintained at a constant temperature to produce the desired concentration of sulfur trioxide in the gas mixture. A liquid trap was placed in the outlet tube leading from the sulfur trioxide supply zone in order to remove droplets of liquid sulfur trioxide entrained in the air-sulfur trioxide vapor stream. The sulfonation reaction mixture following the initial contact of the sulfur trioxide-air stream with the alkylate introduced into the mixing zone was cooled by passing the reaction mixture either into a shell and tube heat exchanger through the jacket of which cooling water was circulated or the mixture was passed directly into a "Votator" comprising a rotating shaft having tangentially fixed blades mounted thereon which distributed a thin layer of the sulfonation reaction mixture over the inside surface of a surrounding cylinder cooled by the circulation of a refrigerant around the outer cylinder. This material was then returned to the reservoir where it was then recirculated through the system until the desired amount of sulfur trioxide had been added. The resulting viscous sulfonation reaction mixture was thereafter immediately diluted in a cooled reaction vessel with water and neutralized with a 30% aqueous solution of sodium hydroxide. The aqueous detergent product consisting of sodium alkyl toluene sulfonate was evaporated to dryness. The determination of the color of the detergent salt was made on the dried sulfonate product by visual observation.

In the present example, a shell and tube heat exchanger was employed to cool the sulfonation reaction mixture and the temperature of the refrigerant through the jacket of the shell and tube exchanger was maintained at approximately 21° C., the sulfonation reaction mixture varying in temperature from 24° C. to 47° C. as the reaction proceeded. The first 50 mole per cent of sulfur trioxide, out of a total of 1.33 moles (based on the dodecyltoluene charge) charged to the sulfonation reaction mixture, was supplied to the sulfonation reaction zone at a concentration of sulfur trioxide in the air of 5 per cent and the remaining sulfur trioxide was charged to the sulfonation reaction mixture at a concentration of sulfur trioxide of 8.8 mole per cent of the vapor in air. Prior to dilution of the sulfonation reaction mixture with water, the total time of contact from the point of initial mixing of the reagent with the alkylate to the point at which the sulfonation reaction was terminated by dilution with water was 166 minutes. Extraction of the neutralized sulfonic acid product with liquid pentane indicated that only 2.7% of the original alkylate charged to the sulfonation reaction remained unsulfonated, the alkylate being sulfonated to the extent of 97.3%. The dried sodium detergent salt was a light cream colored product producing excellent detergency in hard water as well as soft water and was readily soluble in water.

In a similar experiment, except that the sulfur trioxide concentration in the mixture of air and sulfur trioxide was charged initially and through the course of the sulfonation in a concentration of 13.7% sulfur trioxide, the exothermic heat of sulfonation raised the temperature to 70° C. and although 96.2% sulfonation was realized, the color of the dried detergent salt was a relatively deep shade of tan and the product possessed an undesirable odor.

The advantages of the use of a sulfuric acid "heel" during the sulfonation reaction was illustrated in the following experiment in which the reaction conditions of the first experiment indicated above were duplicated, except that the toluene alkylate was admixed with a sulfuric acid "heel" consisting of 98.5% sulfuric acid in an amount equal to about 10% by weight of the alkylate, before introduction into the sulfonation zone with the sulfur trioxide-air mixture. The dried detergent salt was substantially colorless, having only a light yellowish cast, and the detergency of the product as indicated in a standard "Launder-O-Meter" washing test was excellent.

*Example II*

The procedure utilized in the following experiment was substantially similar to that employed in Example I above, except that the sulfonation reaction mixture immediately following the mixing of the reacting components was discharged into a Votator instead of a shell and the tube heat exchanger and the refrigerant circulated through the outer shell of the Votator mixing chamber was water cooled to approximately 20° C. The concentration of sulfur trioxide in the air-sulfur trioxide mixture during the initial stages of the sulfonation (up to about 50 mole per cent of the total of 1.29 mole of sulfur trioxide charged to the reaction) was 4.9 mole per cent of sulfur trioxide, followed by charging the remainder of the sulfur trioxide at a concentration of 12.2 mole per cent sulfur trioxide in admixture with air. A sulfuric acid "heel" of 98.5% sulfuric acid, to the extent of 10% by weight of the alkylate, was added to the alkylate prior to its introduction into the sulfonation zone. The maximum temperature attained during the sulfonation was 42° C. and the reactants were contacted for a period of 166 minutes prior to quenching of the reaction mixture with water. Utilizing the latter method of sulfonation, 97% of the total dodecyl toluene alkylate charging stock underwent sulfonation, and the detergent was a light cream-colored salt of excellent detergency.

We claim as our invention:

1. In a process for the sulfonation of a sulfonatable organic compound in liquid phase in which said sulfonatable organic compound is contacted with a sulfonating agent comprising a mixture of sulfur trioxide vapor and an inert carrier gas therefor at a temperature of from about 0° to about 70° C., the method which comprises supplying the initial 0.5 mole of sulfur trioxide per mole of sulfonatable organic compound to the sulfonation reaction zone during a first sulfonation period at a concentration in said sulfonating agent of not greater than 5 mole per cent and thereafter, during a second sulfonation period, supplying from about 0.5 to 0.8 mole of sulfur trioxide per mole of sulfonatable organic compound at a concentration in said sulfonating agent of from about 5 to about 80 mole per cent, the concentration of sulfur trioxide in the sulfonating agent being higher during said second period than during said first period.

2. The process of claim 1 further characterized in that said sulfonatable organic compound is an alkyl aromatic hydrocarbon.

3. The process of claim 2 further characterized in that said alkyl aromatic hydrocarbon is a long chain, nuclearly substituted benzene hydrocarbon.

4. The process of claim 3 further characterized in that said nuclearly substituted benzene hydrocarbon is an alkyl benzene containing from about 9 to about 18 carbon atoms per alkyl group.

5. The process of claim 3 further characterized in that said nuclearly substituted benzene hydrocarbon is an alkyl toluene hydrocarbon containing from about 9 to about 18 carbon atoms per alkyl group.

6. The process of claim 1 further characterized in that said 0.5 to about 0.8 mole of sulfur trioxide per mole of sulfonatable organic compound is charged into said sulfonation reaction mixture during said second sulfonation period at a concentration of sulfur trioxide in said sulfonating agent of from about 10 to about 20 mole per cent.

7. In a process for sulfonating a sulfonatable organic compound in liquid phase at a temperature of from about 0° to about 70° C. by contacting said sulfonatable organic compound with a sulfonating agent comprising a mixture of sulfur trioxide vapor and an inert carrier gas therefor, an improvement in said process comprising the method of supplying the initial 0.5 mole of sulfur trioxide per mole of sulfonatable organic compound to the sulfonation reaction zone during a first sulfonation period at a concentration in said sulfonating agent of not greater than 5 mole per cent, while maintaining in said sulfonation zone and mixing therein from about 5 to about 20% by weight of the sulfonatable organic compound of sulfuric acid having a concentration of from about 90 to about 100% sulfuric acid and thereafter, during a second sulfonation period supplying from about 0.5 to about 0.8 mole of sulfur trioxide per mole of alkyl aromatic hydrocarbon at a concentration in said sulfonating agent of from about 5 to about 80 mole per cent, the concentration of sulfur trioxide in the sulfonating agent being higher during said second period than during said first period.

8. In the sulfonation of a sulfonatable organic compound wherein said compound is maintained in liquid phase at a temperature of from about 0° to about 70° C. in a reaction zone to which is introduced, for contact with the organic compound, a sulfonating agent comprising a mixture of sulfur trioxide vapor and an inert carrier gas, the improvement which comprises initially maintaining the concentration of sulfur trioxide in said sulfonating agent at below 5 mole per cent, continuing the introduction of the sulfonating agent of less than 5 mole per cent $SO_3$ concentration to the reaction zone until approximately 50 mole per cent of $SO_3$, based on the sulfonatable organic compound, has been supplied to said zone, thereafter increasing the concentration of $SO_3$ in the sulfonating agent to between 5 and 80 mole per cent, and continuing the introduction of the sulfonating agent of increased $SO_3$ concentration to said zone until from about 0.5 to about 0.8 mole of $SO_3$ per mole of sulfonatable organic compound has been supplied to the reaction zone.

9. The process of claim 8 further characterized in that said organic compound is an alkyl aromatic hydrocarbon.

References Cited in the file of this patent

UNITED STATES PATENTS

| Number | Name | Date |
|---|---|---|
| 1,321,994 | Downs | Nov. 18, 1919 |
| 1,824,615 | Myers | Sept. 22, 1931 |
| 1,956,571 | Grillet | May 1, 1934 |
| 2,072,153 | Bruson et al. | Mar. 2, 1937 |
| 2,121,845 | Wernicke | June 28, 1938 |
| 2,364,782 | Flett | Dec. 12, 1944 |
| 2,413,311 | Cohen | Dec. 31, 1946 |
| 2,448,184 | Lemmon | Aug. 31, 1948 |
| 2,450,585 | D'Ouville | Oct. 5, 1948 |
| 2,523,582 | Mattson | Sept. 26, 1950 |
| 2,567,854 | Nixon | Sept. 11, 1951 |